(No Model.)

F. R. BASSETT.
SPRING LOCK EAR RING.

No. 247,873. Patented Oct. 4, 1881.

WITNESSES:
Theo. G. Hoster
C. Sedgwick

INVENTOR:
F. R. Bassett
BY Munn & Co.
ATTORNEYS.

UNITED STATES PATENT OFFICE.

FRED R. BASSETT, OF PAW PAW, MICHIGAN.

SPRING-LOCK EAR-RING.

SPECIFICATION forming part of Letters Patent No. 247,873, dated October 4, 1881.

Application filed July 7, 1881. (No model.)

*To all whom it may concern:*

Be it known that I, FRED R. BASSETT, of Paw Paw, in the county of Van Buren and State of Michigan, have invented a new and useful Improvement in Spring-Lock Ear-Rings, of which the following is a full, clear, and exact description.

My invention consists of hinging the hook to the pendant and providing a spring for holding the hook open or closed, the hook being formed with square faces at the pivot for the impingement of one end of the spring.

Figure 1:
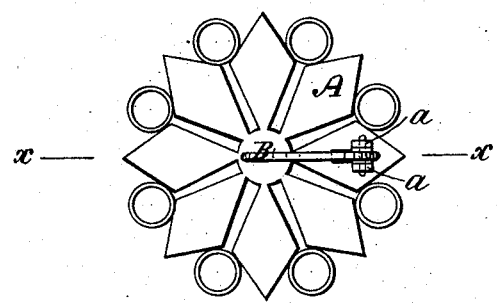
Figure 2:
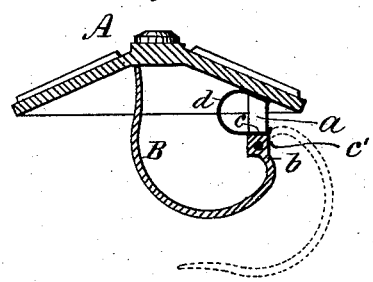

In the accompanying drawings, Figure 1 is a rear elevation of an ear-pendant having my improved hook attached; and Fig. 2 is a section of the same, taken on the line $x\ x$ of Fig. 1.

Similar letters of reference indicate corresponding parts.

To the back of the pendant A is secured the perforated arms or posts $a\ a$, to and between which the hook B is hinged. The hook is formed with the hub $b$, which hub is formed with the square faces $c\ c'$, against which the spring $d$ impinges for holding the hook open or closed, as desired. The spring $d$ is preferably flat and of U form, and placed between the arms or posts $a\ a$, as shown clearly in Fig. 2. When the hook is open, as shown in dotted lines in Fig. 2, the end of the spring will press against the face $c'$ and hold the hook open ready for easy insertion into or removal from the ear, and when the hook has been put through the ear the hook has only to be brought to the position shown in full lines for fastening the ring to the ear. Besides this great convenience in attaching, fastening, and removing the ring from the ear, it will be understood that economy is gained, in that less gold wire is required for the hook, no eye is needed for fastening the end of the hook, and that the hook is not liable to be broken, as the wire of the hook does not have to be bent every time the ring is inserted and removed from the ear, as is the case with the old style of hooks.

Having thus described my invention, I claim as new and desire to secure by Letters Patent—

The combination, with the pendant A and hinged hook B, having square faces $c\ c'$ on its hub, of the spring $d$, made in U form, and arranged to bear on one of said faces to hold the hook either open or closed, as described.

FRED R. BASSETT.

Witnesses:
WILLIAM H. LE SUER,
I. JAY CUMINGS.